(12) United States Patent
Maeda et al.

(10) Patent No.: US 8,979,057 B2
(45) Date of Patent: Mar. 17, 2015

(54) SWINGING SUPPORT DEVICE

(75) Inventors: Kenji Maeda, Osaka (JP); Tomotaka Takeuchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 379 days.

(21) Appl. No.: 13/082,415

(22) Filed: Apr. 8, 2011

(65) Prior Publication Data

US 2011/0253866 A1 Oct. 20, 2011

(30) Foreign Application Priority Data

Apr. 15, 2010 (JP) .................................. 2010-093820

(51) Int. Cl.
*A47H 1/10* (2006.01)
*F16M 11/10* (2006.01)
*F16M 11/18* (2006.01)
*F16M 13/02* (2006.01)

(52) U.S. Cl.
CPC ............... *F16M 11/10* (2013.01); *F16M 11/18* (2013.01); *F16M 13/027* (2013.01); *Y10S 248/923* (2013.01)
USPC .......................... 248/320; 248/291.1; 248/923

(58) Field of Classification Search
CPC ...... F16M 11/10; F16M 11/18; F16M 13/027
USPC .............. 248/288.11, 291.1, 299.1, 317, 318, 248/320, 922, 923
See application file for complete search history.

(56) References Cited

U.S. PATENT DOCUMENTS

| | | | | |
|---|---|---|---|---|
| 6,059,255 A * | 5/2000 | Rosen et al. | ............... | 248/291.1 |
| 6,199,810 B1 * | 3/2001 | Wu et al. | .................... | 248/291.1 |
| 6,340,146 B1 * | 1/2002 | Tzeng | ............................ | 248/317 |
| 7,090,186 B2 * | 8/2006 | Quinno et al. | ................ | 248/324 |
| 7,124,989 B1 * | 10/2006 | Lee et al. | .................. | 248/288.11 |
| 2005/0189461 A1 * | 9/2005 | Peng | ............................. | 248/317 |
| 2005/0205741 A1 * | 9/2005 | Chen | ............................. | 248/317 |
| 2012/0318836 A1 * | 12/2012 | Maeda et al. | ................. | 224/311 |

FOREIGN PATENT DOCUMENTS

| | | |
|---|---|---|
| JP | H05-097098 A | 4/1993 |
| JP | 2007-161041 A | 6/2007 |
| JP | 2007-171922 A | 7/2007 |

* cited by examiner

*Primary Examiner* — Gwendolyn W Baxter
(74) *Attorney, Agent, or Firm* — James W. Judge

(57) ABSTRACT

A swinging support device is provided which includes: a display device 120 which is opened and closed between a stowage position 121 and a view position 122; an opening and closing mechanism 110 operable to open and close the display device 120; a retaining mechanism 130 for holding the display device 120 located at the view position 122 by switching between at least two levels of retaining forces; a first acceleration sensor 160 mounted to a top inner surface portion 190 of a movable carrier in the vicinity of the display device 120; and a second acceleration sensor 170 mounted to the display device 120.

11 Claims, 3 Drawing Sheets

SWINGING SUPPORT DEVICE

CROSS REFERENCE TO RELATED APPLICATION

The disclosure of Japanese Patent Application No. 2010-093820, filed on Apr. 15, 2010, is incorporated herein by reference.

BACKGROUND OF THE INVENTION

1. Field of the Invention

The present invention relates to a display device opening-and-closing system that is mounted in a movable carrier such as an aircraft and a train, and is operable to open and close the display device between a stowage position and a view position (use position).

2. Description of the Background Art

In recent years, a display device is provided above passengers' seats and/or on the back surface of a backrest of a passenger's seat in a movable carrier, particularly, in an aircraft so as to display, as an in-flight entertainment service, contents such as movies and flight information indicating, for example, an actual location.

A display device provided on the back surface of a backrest of a passenger's seat is for personal use, whereas display devices provided above passengers' seats can be each shared and viewed by several passengers.

FIG. 5 is a schematic diagram illustrating a display device which is provided above passengers' seats in an aircraft. In FIG. 5, a display device 420, which is designed so as to be provided above passengers' seats 410, is stowed in a stowage position 421 in a cabin top inner surface portion 440 when the display device 420 is not used, so as to ensure a space above the passengers' seats 410 and safety for passengers 430. When the display device 420 is used, the display device is opened, and held in a view position 422 to display a video image.

For this type of display device, a liquid crystal display is used in many cases. In consideration of the characteristics of a view angle for the liquid crystal display, the display needs to be opened such that the view position is 90 degrees or more away from the stowage position. Therefore, in order to hold the display device in the view position, a drive shaft needs to have mounted thereto a retaining mechanism, such as a clutch or a brake, for holding the display device.

On the other hand, this type of display device needs to normally operate, with certainty, under a certain amount of shaking, while the display device needs to be closed into the stowage position for safety when at least a predetermined amount of force is applied to the display device from behind the display device, for example, when a person or any other object collides against the display device, because the top of the cabin is lower at the view position for the display device.

An example in which a focus is placed on influence of shaking of the movable carrier is disclosed in Japanese Laid-Open Patent Publication No. 2007-161041 (hereinafter, referred to as Patent Document 1), and an example in which safety is considered in the case of a collision between a person and a display device is disclosed in Japanese Laid-Open Patent Publication No. 5-97098 (hereinafter, referred to as Patent Document 2).

In the conventional display device opening-and-closing system for use in a movable carrier as disclosed in Patent Document 1, shaking of the movable carrier is detected, and when at least a certain amount of shaking of the movable carrier is detected, the holding state is changed. Thus, deviation of the display device from the view position can be prevented.

However, only the shaking of the movable carrier itself is detected, and impact to the display device is not detected. Therefore, although normal operation can be maintained under a shaking state, it cannot be detected that at least a certain amount of force has been applied to the display device located at the view position, from behind the display device. Therefore, it is impossible to alleviate impact of a colliding person or any other colliding object. Further, the display device may be damaged.

Further, Patent Document 2 discloses that, when a predetermined amount of force is applied to the display device, the display device is detached from a driving mechanism by means of a slipping clutch so as to freely swing.

Thus, in the event of collision of a person against the display device, the slipping clutch is operable to retract the display device, thereby absorbing some amount of force.

However, depending on shaking of a movable carrier, the display device is automatically stowed when no person collides against the display device. In order to prevent the display device from being stowed due to the shaking of the movable carrier, retaining force needs to be increased, so that the impact of a colliding person is also increased. Further, the display device may be damaged.

Namely, the conventional openable and closable display device which is mounted to the cabin top inner surface portion of the movable carrier cannot be designed such that the display device is held in the view position even under a certain amount of shaking, while the display device is closed into the stowage position for safety when at least a certain amount of force is applied to the display device located at the view position, from behind the display device. That is, these contradictory operation specifications cannot go together.

Therefore, an object of the present invention is to provide a display device opening-and-closing system which is used for a display device designed so as to open and close between a stowage position and a view position, and which is capable of not only holding the display device in the view position even under a certain amount of shaking, but also causing the display device to be stowed for safety when at least a certain amount of force is applied to the display device located at the view position, from behind the display device. This type of display device opening-and-closing system can be realized by using a swinging support device of the present invention the application of which is not limited to display devices.

SUMMARY OF THE INVENTION

In order to solve the problems described above, a swinging support device according to one aspect of the present invention is provided in a movable carrier, and supports a subject article provided in the movable carrier to let the subject article swing between a use position and a stowage position. The swinging support device includes: a swinging mechanism for swinging the subject article; a retaining mechanism for holding the subject article in the use position with at least two levels of retaining force; an acceleration sensor for detecting acceleration of the movable carrier; and a control unit for controlling, according to the acceleration of the movable carrier, the retaining mechanism to switch between the two levels of the retaining force. Further, a swinging support device according to another aspect of the present invention includes: a swinging mechanism for swinging the subject article; a retaining mechanism for holding the subject article in one of the e position and the stowage position; a first acceleration sensor for detecting acceleration of the movable carrier; a second acceleration sensor for detecting acceleration of the subject article; and a control unit for controlling the swinging mechanism according to the acceleration of the movable carrier and the acceleration of the subject article.

In the features described above, the shaking of the movable carrier is detected, and a voltage to be supplied to the retaining mechanism for holding the display device which is the subject article is varied by the voltage-variable circuit, so that the retaining force for holding the display device can be determined based on the state of the movable carrier. Therefore, when the movable carrier is greatly shaking, the retaining force is increased, and the display device is held in the view position with the increased retaining force, and in a normal state where the shaking of the movable carrier is small, the retaining force is reduced to alleviate impact of a colliding person. Further, when at least a certain amount of force is detected (when a person has collided) by detecting the shaking of the movable carrier and the shaking of the display device, the display device can be stowed.

As described above, the swinging support device according to the present invention holds the display device which is the subject article, in the view position, even when the shaking of the movable carrier is great. Further, the swinging support device according to the present invention is able to alleviate impact of a colliding person in a normal state, and the display device can be stowed when it is detected that at least a certain amount of force has been applied to the display device, from behind the display device.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, an embodiment of the present invention will be described with reference to the drawings.

Figure 1:
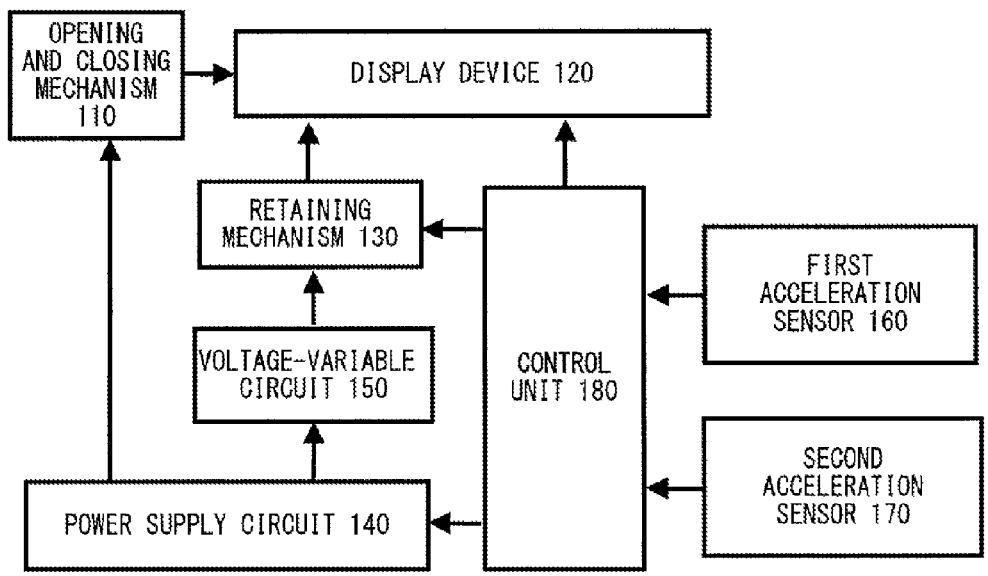
FIG. 1 is a block diagram illustrating a structure of a display device opening-and-closing system according an embodiment of the present invention.
Figure 2:
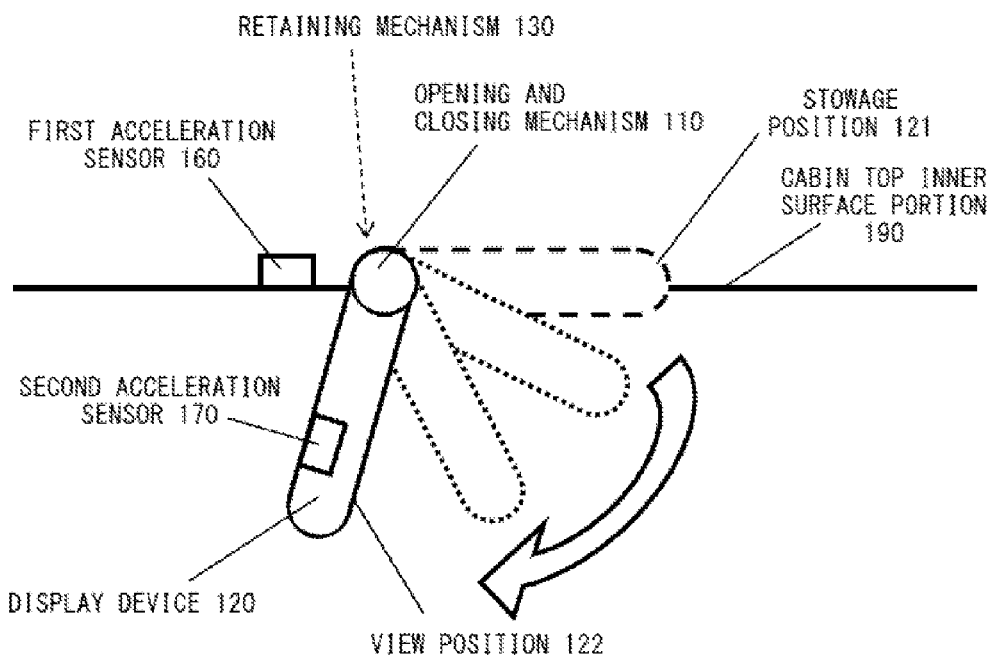
FIG. 2 is a conceptual diagram illustrating an opening and closing operation of the display device opening-and-closing system according to the embodiment of the present invention.
Figure 3:
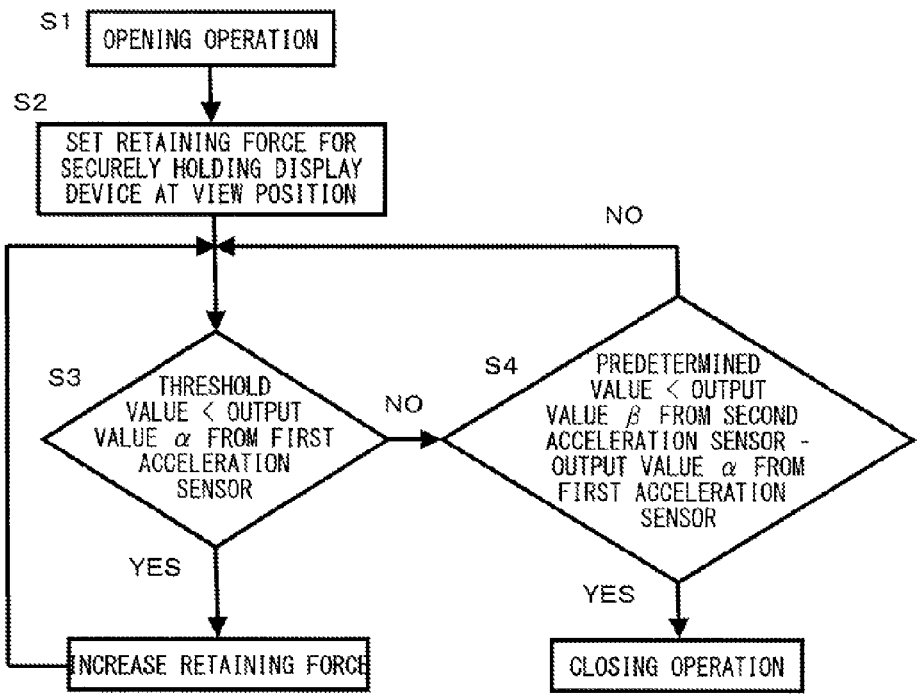
FIG. 3 is a flow chart showing an operation performed by the display device opening-and-closing system according to the embodiment of the present invention.
Figure 5:
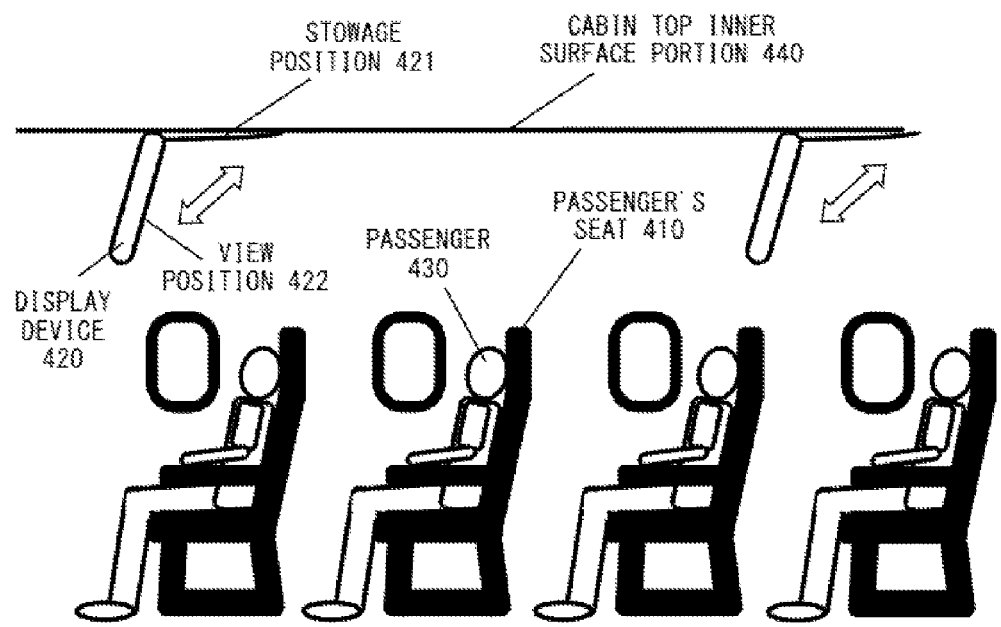
FIG. 5 is a schematic diagram illustrating an inside of an aircraft in which a display device is provided.

FIG. 1 is a block diagram illustrating a structure of a display device opening-and-closing system to which a swinging support device of the present invention is applied. FIG. 2 is a diagram illustrating an opening and closing operation for the display device. The display device shown in FIG. 2 is similar to the display device (a subject article to which the present invention is applied) which is provided above passengers' seats in an aircraft (movable carrier) as shown in FIG. 5 as a conventional art. Further, FIG. 3 is a flow chart showing an operation for the display device. The subject article to which the present invention is applied is not limited to display devices, and the movable carrier is not limited to aircrafts.

In FIG. 1 and FIG. 2, an opening and closing mechanism (swinging mechanism) 110 is operable to open and close (swings) a display device 120. The display device 120 is caused to swing between a view position 122 and a stowage position 121 of a cabin top inner surface portion 190. A retaining mechanism 130 securely holds the display device 120 in the view position 122.

The opening and closing mechanism 110 and the retaining mechanism 130 have structures used for conventional display device opening-and-closing systems, and the detailed description of the structures is not given.

A power supply circuit 140 acts as a power source for the display device 120, the opening and closing mechanism 110, and the retaining mechanism 130. The voltage-variable circuit 150 is an electric circuit which can switch a supply voltage from the power supply circuit 140 to the retaining mechanism 130 between at least two levels, that is, between a higher level and a lower level.

The retaining force of the retaining mechanism 130 varies according to a supplied voltage. Namely, the retaining force can be switched between two levels of forces, that is, between a stronger force and a weaker force.

A first acceleration sensor 160 is mounted to the cabin top inner surface portion 190 in the vicinity of a position at which the display device 120 is secured to the cabin top inner surface portion 190, and detects shaking of a body of the aircraft.

A second acceleration sensor 170 is mounted to a housing of the display device 120, and detects impact to the display device 120.

A control unit 180 controls a voltage to be supplied to the opening and closing mechanism 110 and the retaining mechanism 130, and distributes video images to the display device 120.

The opening and closing mechanism 110 is operable to open the display device 120 according to a voltage supply. When a voltage supply is interrupted, the display device 120 is automatically closed into the stowage position 121 by using an urging force caused by a spring (not shown) or the like. The opening and closing mechanism 110 has a position detection function (not shown), and prevents the display device 120 from opening beyond the view position 122.

The retaining mechanism 130 exerts the retaining force for holding the display device 120 against the closing direction of the display device 120, while the retaining mechanism 130 exerts no retaining force against the opening direction of the display device 120.

The first acceleration sensor 160 mounted to the cabin top inner surface portion 190 to which the display device 120 is secured, and the second acceleration sensor 170 mounted to the display device 120 are each capable of detecting acceleration along at least two axes, that is, acceleration along vertical and horizontal axes relative to the direction in which the display device 120 is opened and closed.

An operation performed by the display device opening-and-closing system having the structure as described above will be described with reference to an operation flow chart shown in FIG. 3.

When a service for displaying video images by means of the display device 120 is started, the control unit 180 outputs, to the power supply circuit 140, an instruction for supplying a voltage to the opening and closing mechanism 110. Thus, the display device 120 stowed in the stowage position 121 in the cabin top inner surface portion 190 is caused to open (S1).

After the display device 120 has reached the view position 122, the control unit 180 outputs, to the power supply circuit 140, an instruction for stopping voltage supply to the opening and closing mechanism 110. Thus, the voltage supply from the power supply circuit 140 to the opening and closing mechanism 110 is interrupted.

At this time, the control unit 180 reads an output value α outputted from the first acceleration sensor 160 mounted to the cabin top inner surface portion 190 to which the display device 120 is secured, and determines a voltage value corresponding to the retaining force based on the output value α outputted from the first acceleration sensor 160.

Next, the control unit 180 indicates, to the voltage-variable circuit 150, a value of a voltage to be supplied. Thereafter, the voltage to be supplied to the retaining mechanism 130 is switched by the voltage-variable circuit 150 to securely hold the display device 120 in the view position 122 (S2).

After the service for displaying the video images is started, when the output value α outputted from the first acceleration sensor 160 mounted to the cabin top inner surface portion 190 is greater than a threshold value (YES in S3), the control unit 180 determines that the aircraft itself is greatly shaking, and outputs, to the voltage-variable circuit 150, an instruction for increasing a voltage to be supplied to the retaining mechanism 130.

In response to the instruction from the control unit 180, the voltage to be supplied to the retaining mechanism 130 is switched by the voltage-variable circuit 150 so as to be increased, thereby increasing the retaining force for holding the display device 120 located at the view position 122. Namely, the retaining force is switched to the stronger of the two levels of the retaining forces.

On the other hand, when the output value α outputted from the first acceleration sensor 160 mounted to the cabin top inner surface portion 190 is less than or equal to the threshold value (NO in S3), the control unit 180 reads an output value β outputted from the second acceleration sensor 170 mounted to the display device 120, and thereafter calculates a difference between the output value α outputted from the first acceleration sensor 160 mounted to the cabin top inner surface portion 190 and the output value β outputted from the second acceleration sensor 170 mounted to the display device 120.

When the difference between the output value α outputted from the first acceleration sensor 160 mounted to the cabin top inner surface portion 190 and the output value β outputted from the second acceleration sensor 170 mounted to the display device 120, is greater than a predetermined value (YES in S4), the control unit 180 determines that a person or another object has collided against the display device 120, and outputs, to the power supply circuit 140, an instruction for interrupting the voltage supply to the retaining mechanism 130.

In response to the instruction from the control unit 180, the power supply circuit 140 stops the voltage supply to the retaining mechanism 130, and the display device 120 is closed into the stowage position 121 of the cabin top inner surface portion 190 by using an urging force caused by a spring of the opening and closing mechanism 110.

On the other hand, when the difference between the output value α outputted from the first acceleration sensor 160 mounted to the cabin top inner surface portion 190 and the output value β outputted from the second acceleration sensor 170 mounted to the display device 120, is less than or equal to the predetermined value (NO in S4), the retaining mechanism 130 continues to hold the display device 120 by maintaining, as it is, the retaining force (the weaker of the two levels of the retaining forces) which has been exerted.

As described above, according to the present embodiment, the display device opening-and-closing system includes: the retaining mechanism 130 for holding the display device 120 in the view position 122; the first acceleration sensor 160 which is mounted to the cabin top inner surface portion 190 of the movable carrier at which the display device 120 is secured; the second acceleration sensor 170 secured to the display device 120; the control unit 180 for calculating a state of the display device 120 based on the output value α from the first acceleration sensor 160 and the output value β from the second acceleration sensor 170; and the voltage-variable circuit 150 operable to vary the retaining force of the retaining mechanism 130 for holding the display device, based on the result of the calculation of the control unit 180.

Thus, both the shaking of the movable carrier and the shaking of the display device can be detected. Therefore, even when the shaking of the movable carrier is great, the display device can be held in the view position. In a normal state in which the shaking of the movable carrier is small, the retaining force is reduced for safety in consideration of a case where, for example, a person collides against the display device located at the view position, from behind the display device. Further, when at least a certain amount of force is applied to the display device, the display device is closed into the stowage position. These contradictory operation specifications as described above can be satisfied.

For example, when the shaking of the movable carrier is great, a person is less likely to move from a seat, and will pay attention to the surroundings. Therefore, careless collision of the person against the display device in the opened state is less likely to occur, and it does not matter if the retaining force is increased.

On the other hand, when the shaking of the movable carrier is small, a person is likely to move from a seat, and is likely to be careless. Therefore, the person is likely to collide against the display device in the opened state. In this case, when the retaining force is reduced, the impact of the collision is reduced, and the person is less likely to be injured. Further, the display device is less likely to be damaged.

In the present embodiment, although the first acceleration sensor is mounted to the top inner surface portion of the movable carrier in the vicinity of the display device, the first acceleration sensor may be mounted to the display device in a portion in which the display device is mounted to the movable carrier. In this case, the shaking for the vicinity of the display device can be detected with enhanced accuracy, thereby enabling enhancement of accuracy for controlling the retaining force.

Figure 4:
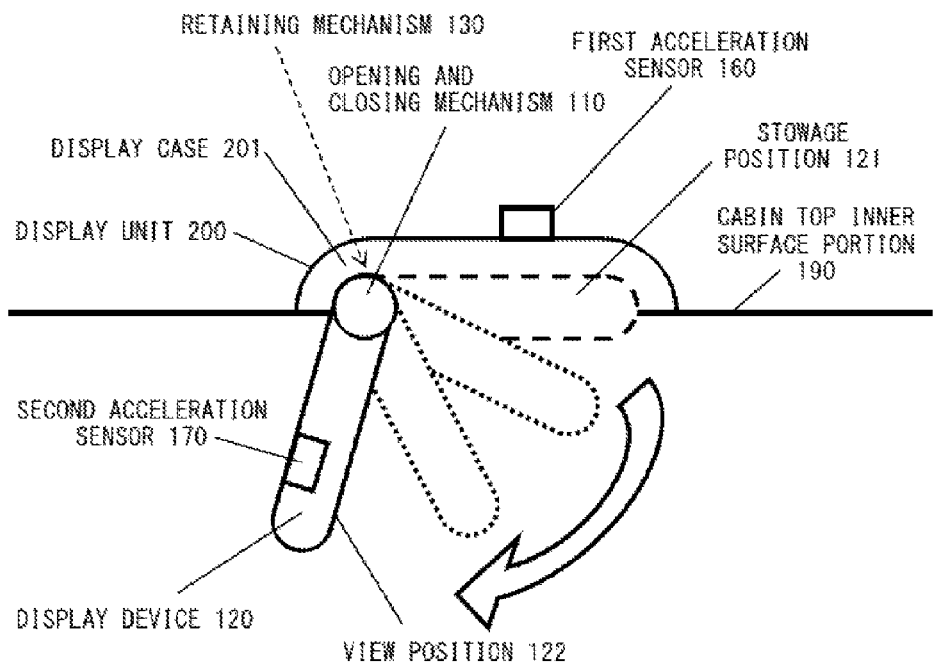
FIG. 4 is a conceptual diagram illustrating an opening and closing operation of the display device opening-and-closing system according to an exemplary modification of the present invention.

Further, as shown in FIG. 4, the first acceleration sensor may be mounted to a display case 201 of a display unit 200 on the movable carrier side (that is, on the movable carrier top inner surface portion 190 side). In this case, the first acceleration sensor 160 may be produced so as to be integrated with the display unit 200, thereby reducing cost. When the first acceleration sensor 160 is mounted to the movable carrier as shown in FIG. 2, wiring is necessary for connecting between the display unit 200 and the first acceleration sensor 160. However, when the first acceleration sensor 160 is integrated with the display unit 200, the wiring for connecting between the display unit 200 and the first acceleration sensor 160 is unnecessary, so that the reduction in cost can be increased, and production steps for incorporating the display unit 200 into the movable carrier can be eliminated.

Further, in the present embodiment, the retaining force for holding the display device in the view position is switched between two levels of retaining force. However, the number of the levels of the retaining force to be switched may be increased. In this case, the control may be minutely performed according to the levels of the shaking of the movable carrier.

The display device opening-and-closing system according to the present invention ensures the visibility for passengers when the movable carrier is shaking, and, in a normal state, the safety for the passengers can be considered. Therefore, the display device opening-and-closing system according to the present invention is useful as, for example, a display device opening-and-closing system which is provided in a movable carrier such as an aircraft.

While the invention has been described in detail, the foregoing description is in all aspects illustrative and not restrictive. It will be understood that numerous other modifications and variations can be devised without departing from the scope of the invention.

What is claimed is:

1. A support device, provided in a movable carrier, for supporting a display device, provided in a cabin top inner surface portion of the movable carrier, configured to move to a view position when being opened from a closed state in a stowage position in the cabin top inner surface portion, the support device comprising:
    an opening-and-closing mechanism configured to move the display device about a drive shaft from the stowage position to the view position upon receiving a supply of voltage, and to move the display device about the drive shaft from the view position to the stowage position when the supply of voltage to the holding mechanism is stopped;
    a holding mechanism provided for the drive shaft and configured to hold the display device in the view position with at least two levels of holding force upon receiving a supply of voltage when the display device is moved to the view position by the opening-and-closing mechanism;
    an acceleration sensor provided in the movable carrier and configured to detect acceleration of the movable carrier; and
    a control unit configured to
    (i) control the supply of voltage to the opening-and-closing mechanism to cause the opening-and-closing mechanism to move the display device from the stowage position to the view position,
    (ii) control, when the acceleration of the movable carrier detected by the acceleration sensor is greater than a threshold value, the supply of voltage to the holding mechanism to cause the holding mechanism to hold the display device in the view position with the higher of the two levels of holding force, and
    (iii) stop the supply of voltage to the holding mechanism, to cause the opening-and-closing mechanism to move the display device from the view position to the stowage position.

2. The support device according to claim 1, wherein when the acceleration of the movable carrier detected by the acceleration sensor is less than or equal to the threshold value, the control unit controls the supply of voltage to the holding mechanism, thereby causing the holding mechanism to hold the display device in the view position with the lower of the two levels of holding force.

3. The support device according to claim 1, further comprising a voltage-variable circuit configured to vary voltage supplied to the holding mechanism; wherein:
    the holding force of the holding mechanism is variable according to the voltage supplied from the voltage-variable circuit; and
    the control unit varies the voltage supplied from the voltage-variable circuit to the holding mechanism, based on information from the acceleration sensor.

4. The support device according to claim 1, wherein the opening-and-closing mechanism is configured to apply force on the display device toward a side of the stowage position while the display device is held in the view position by the holding mechanism, and, when the supply of voltage to the holding mechanism is stopped, move the display device from the view position to the stowage position by the force toward the side of the stowage position.

5. The support device according to claim 1, wherein the acceleration sensor is able to detect acceleration along horizontal and vertical axes relative to opening-and-closing movement of the opening-and-closing mechanism.

6. The support device according to claim 1, wherein the holding mechanism is a brake or a clutch.

7. A support device, provided in a movable carrier, for supporting a display device, provided in a cabin top inner surface portion of the movable carrier, configured to move to a view position when being opened from a closed state in a stowage position in the cabin top inner surface portion, the support device comprising:
    an opening-and-closing mechanism configured to move the display device about a drive shaft from the stowage position to the view position upon receiving a supply of voltage, and to move the display device about the drive shaft from the view position to the stowage position when the supply of voltage to the holding mechanism is stopped;
    a holding mechanism provided for the drive shaft and configured to hold the display device in the view position upon receiving a supply of voltage when the display device is moved to the view position by the opening-and-closing mechanism;
    a first acceleration sensor provided in the movable carrier and configured to detect acceleration of the movable carrier;
    a second acceleration sensor, attached to the display device, configured to detect acceleration of the display device; and
    a control unit configured to
    (i) control the supply of voltage to the opening-and-closing mechanism to cause the opening-and-closing mechanism to move the display device from the stowage position to the view position, and
    (ii) stop the supply of voltage to the holding mechanism when a difference between acceleration of the movable carrier detected by the first acceleration sensor and acceleration of the display device detected by the second acceleration sensor is greater than a predetermined value, to cause the opening-and-closing mechanism to move the display device from the view position to the stowage position.

8. The support device according to claim 7, further comprising a voltage-variable circuit configured to vary voltage supplied to the holding mechanism; wherein:
    the holding force of the holding mechanism is variable according to the voltage supplied from the voltage-variable circuit; and;
    the control unit varies the voltage supplied from the voltage-variable circuit to the holding mechanism, based on information from the first acceleration sensor.

9. The support device according to claim 7, wherein the opening-and-closing mechanism is configured to apply force on the display device toward a side of the stowage position while the display device is held in the view position by the holding mechanism, and, when the supply of voltage to the holding mechanism is stopped, move the display device from the view position to the stowage position by the force toward the side of the stowage position.

10. The support device according to claim 7, wherein the first and the second acceleration sensors are each able to detect acceleration along horizontal and vertical axes relative to opening-and-closing movement of the opening-and-closing mechanism.

11. The support device according to claim 7, wherein the holding mechanism is a brake or a clutch.

* * * * *